US009987696B2

(12) United States Patent
Cloutier et al.

(10) Patent No.: US 9,987,696 B2
(45) Date of Patent: Jun. 5, 2018

(54) AUTOMATED BORE FINISHING PROCESS (75) Inventors: Daniel R. Cloutier, Clive, IA (US);
Scott W. Alcock, St. Louis, MO (US);
Terry R. Heller, St. Louis, MO (US);
Russell L. Jacobsmeyer, Labadie, MO (US)

(73) Assignee: Sunnen Products Company, St. Louis, MO (US)

( * ) Notice: Subject to any disclaimer, the term of this patent is extended or adjusted under 35 U.S.C. 154(b) by 606 days.

(21) Appl. No.: 13/321,283

(22) PCT Filed: May 24, 2010

(86) PCT No.: PCT/US2010/035914
§ 371 (c)(1),
(2), (4) Date: Feb. 2, 2012

(87) PCT Pub. No.: WO2010/135729
PCT Pub. Date: Nov. 25, 2010

(65) Prior Publication Data
US 2012/0129432 A1    May 24, 2012

(51) Int. Cl.
*B24B 51/00* (2006.01)
*B23D 75/00* (2006.01)
*B24B 33/02* (2006.01)
*B24B 37/02* (2012.01)
*B24B 49/00* (2012.01)

(52) U.S. Cl.
CPC .............. *B23D 75/00* (2013.01); *B24B 33/02* (2013.01); *B24B 37/02* (2013.01); *B24B 49/00* (2013.01)

(58) Field of Classification Search
CPC ......... B23D 75/00; B24B 33/02; B24B 37/02; B24B 49/00

USPC .......................... 451/5, 27, 51, 61, 156, 213
IPC ............................................. B24B 33/00,33/02
See application file for complete search history.

(56) References Cited

U.S. PATENT DOCUMENTS

| 2,826,010 A | * | 3/1958 | Roser .................... B24B 33/022 451/320 |
| 3,390,068 A | * | 6/1968 | Ellis et al. ..................... 204/217 |
| 3,702,043 A | * | 11/1972 | Welbourn et al. ............ 451/213 |
| 4,047,639 A | * | 9/1977 | McNamara et al. ............ 222/64 |
| 4,187,644 A | * | 2/1980 | Fitzpatrick .................... 451/151 |

(Continued)

FOREIGN PATENT DOCUMENTS

| DE | 10315218 A1 * 10/2004 ............. B24B 33/00 |
| EP | 0539194 B1    7/1995 |

OTHER PUBLICATIONS

DE 10315218A1—Oct. 2004—English Machine Translation.*

*Primary Examiner* — Marc Carlson
(74) *Attorney, Agent, or Firm* — Matthews Edwards LLC (57) ABSTRACT

An automated bore finishing process particularly adapted for lapping automatically corrects one or more bore parameters, such as diameter, geometry, surface finish, in an iterative manner to reach a final value, controlled by algorithms that process feedback from a measurement process. The process determines bore parameter information and determines an optimum set of values for the process parameters, such as stroke position, stroke length and duration of the next lapping iteration. This optimization is targeted to achieve the desired final bore parameter or parameters within the specified bore size limits, and may be used to alter the stroke profile either for the entire next iteration or in a continuously changing manner, to minimize or eliminate bore defects over one or a succession of iterations.

23 Claims, 3 Drawing Sheets

(56) References Cited

U.S. PATENT DOCUMENTS

| | | | | |
|---|---|---|---|---|
| 4,287,749 | A | * | 9/1981 | Bachrach et al. ............... 72/467 |
| 4,455,789 | A | * | 6/1984 | Gehring ........................ 451/156 |
| 4,721,839 | A | * | 1/1988 | Dzewaltowski et al. .. 219/69.17 |
| 5,088,237 | A | * | 2/1992 | Nagel et al. .................... 451/27 |
| 5,095,662 | A | * | 3/1992 | Grimm et al. .................... 451/5 |
| 5,155,944 | A | * | 10/1992 | Nagel et al. .................... 451/51 |
| 5,177,904 | A | * | 1/1993 | Nagel et al. .................... 451/27 |
| 5,651,720 | A | * | 7/1997 | Shinomoto et al. ............... 451/8 |
| 5,871,391 | A | * | 2/1999 | Pryor ................................ 451/9 |
| 6,425,808 | B1 | * | 7/2002 | Higashikawa ................ 451/180 |
| 6,551,178 | B1 | * | 4/2003 | Tanaka et al. ................ 451/180 |
| 6,585,571 | B2 | * | 7/2003 | Hyatt et al. .................... 451/61 |
| 6,817,925 | B2 | * | 11/2004 | Saigo et al. .................... 451/36 |
| 7,371,149 | B2 | * | 5/2008 | Cloutier et al. .................. 451/5 |
| 7,575,502 | B2 | * | 8/2009 | Cloutier et al. .................. 451/5 |
| 8,096,853 | B2 | * | 1/2012 | Moehn et al. .................. 451/11 |
| 8,277,280 | B2 | * | 10/2012 | Cloutier et al. .................. 451/5 |
| 8,348,718 | B2 | * | 1/2013 | Martin et al. .................... 451/5 |
| 2001/0034196 | A1 | * | 10/2001 | Hyatt et al. .................... 451/61 |
| 2002/0037688 | A1 | * | 3/2002 | Higashikawa ................ 451/180 |

* cited by examiner

AUTOMATED BORE FINISHING PROCESS

This application is submitted under 35 U.S.C. 371 claiming priority to PCT/US2010/35914, filed May 24, 2010, which application claims the benefit of U.S. Provisional Application No. 61/180,699, filed May 22, 2009.

TECHNICAL FIELD

The present invention relates generally to an automated bore finishing process, and more particularly, to a process involving a machine capable of rotating and reciprocating a bore finishing tool such as a lapping tool relative to a workpiece bore in combination with an automated bore gaging system. The output from the gaging system is inputted to machine control software such that all necessary compensations required to adjust the control parameters of the bore finishing, e.g., lapping, process so that the required bore size and geometry will be achieved without human intervention. This automated process may include changing process parameters including, but not limited to, the renewed application of abrasive to the surface of the lap, the expansion of the lap, as well as the cleaning of the workpiece bore and/or the measurement of a mating part when the bore is to be matched to that part.

BACKGROUND ART

U.S. Provisional Application No. 61/180,699, filed May 22, 2009, is incorporated herein by reference in its entirety.

Precision bore finishing for the purpose of achieving a specified parameter or parameters, e.g., diameter, geometry, and surface finish, is commonly accomplished via a variety of well known material removal processes. These processes have progressed over many years to be generally automatic or semi-automatic. A less commonly used bore finishing technique is lapping which is distinguished from honing or grinding by the fact that lapping uses loose abrasive that acts between a lapping tool and the workpiece bore. Although machines have been made that provide a stroking and rotating motion for the lapping tool, lapping is typically a manual process where an operator strokes a workpiece on a tool rotating in a simple spindle in reciprocating movement. Regardless of whether the stroking is machine driven or hand driven, lapping is an iterative process that requires operators to periodically apply more abrasive, expand the lapping tool, manually adjust the stroking, and make other fine process adjustments based on precise bore measurements and often on the perceived "feel" of the workpiece (to the hand of the operator) when being hand stroked on the rotating lapping tool. All of this depends on the experience and judgment of the individual bore lapping operator, with the accuracy and efficiency highly reliant on the specific operator skills.

Manual lapping of bores has been known for quite a long time. In recent years there has been some work done involving mechanizing the lapping of bores that do not rely on operator skill.

Dzewaltowski, et al. U.S. Pat. No. 4,721,839 mentions a bore lapping operation as part of a larger automated process for producing fuel injector nozzles. However, bore lapping does not appear to be the focus of this invention. No mention is made of correcting the bore size or geometry that is produced based on feedback of bore measurements.

Shinomoto, et al. U.S. Pat. No. 5,651,720 refers to lapping and lapping tools used in a machine, but it is clear from this patent that the inventor is using tools where the surface of the lapping tool is coated with a layer of abrasive grit retained by electroplated metal (i.e. "fixed abrasive"). Other such prior art can be found where plated abrasive tools are employed and the term "lapping" is used. Some consider the term "lapping" to be misapplied in these cases as it is our understanding that lapping involves the application of loose abrasive (or abrasive suspended in a fluid or semisolid medium), which acts in the mode of three-body wear. The surface quality (texture, lack of edge burrs, etc.) that is characteristic of three-body lapping wear offers significant benefit over honing with fixed abrasive. Therefore the present invention constitutes an improvement over any prior art using fixed abrasives.

Saigo, et al U.S. Pat. No. 6,817,925 and Maeda, et al. European Patent EP0539194 both pertain to machines that use wire continuously running through the small bore of a workpiece to lap that bore. This process has no means to correct bore geometry beyond the inherent result of running the wire and abrasive through the bore. This process is also not feasible for bore diameters larger than the diameter of a wire sufficiently flexible to run through the required mechanism.

Thus, what is sought is an automated bore finishing process, particularly adapted for lapping, which corrects one or more parameters, e.g., bore diameter, geometry, surface finish, in an iterative self-correcting manner, and which overcomes one or more of the shortcomings set forth above.

SUMMARY OF THE INVENTION

What is disclosed is an automated bore finishing process, particularly adapted for lapping, which automatically corrects one or more bore parameters, e.g., bore diameter, geometry, surface finish, in an iterative self-correcting manner, and which overcomes one or more of the shortcomings set forth above.

According to a preferred aspect of the invention, two critical parameters are the focus: progression toward or maintaining the required bore geometry, e.g., cylindricity; and material removal rate sufficient to maintain productivity objectives, e.g., to keep the material removal rate at a sufficient level that minimizes the cycle time while still maintaining the required bore geometry. In the present invention these elements are controlled by algorithms that process feedback from a measurement process in addition to specific mechanism design features. The process is iterative and involves gathering bore geometry information by gaging the bore in a number of locations. These bore measurements, taken at known axial locations, are treated mathematically to determine an optimum set of values for the lapping control parameters, such as stroke position, stroke length and duration of the next lapping iteration. This optimization is targeted to achieve the desired bore parameter, which can be geometry, e.g., cylindricity, straightness, within the specified bore size limits. The data may be used to alter the stroke profile either for the entire next iteration or in some continuously changing fashion. In this manner bore defects are minimized or eliminated over successive iterations.

According to another preferred aspect of the invention, it is recognized that some localized bore defects can be difficult to remove by a finishing process such as lapping due to other features on the workpiece. The invention overcomes this, via a control program which provides an option for an operator to enter the bore size profile dimensions of a known "good" workpiece, e.g., having a non-cylindrical shape, so that the program can target that known "good" bore profile. This allows for some level of defect in certain location, and can be used to create a deliberate non-cylindrical profile, e.g. a specified amount of taper in a specified direction. This can have utility, for instance for workpieces having asymmetrical interruptions, such as ports and the like, in very thin bore walls, and wherein the workpiece is to be restrained, heated, etc., during use in a manner that will correct the "defect".

According to a preferred step of the process of the invention, the bore measurements taken at the end of each iteration are compared to those from the last iteration. With that data and the known cycle time of the last iteration, a rate of material removal is calculated. This can be used in several ways. As one, it can be compared to some minimum acceptable rate for achieving desired progress toward the finished value for the bore parameter that is entered by an operator or recalled from previously stored setup data. When the material removal rate for one iteration has fallen below the minimum acceptable rate, thus indicating that the bore parameter is not adequately progressing toward the final value therefor, a corrective action or actions will automatically be implemented. In a lapping process, the corrective action can involve, but is not limited to, one or both of the following: applying more lapping compound to the surface of the lap; and/or expanding the lap by an amount that is determined by setup data or by the control program; and/or utilizing a lapping compound having a different characteristic or characteristics, such as, but not limited to, a compound having different size abrasive grits and/or concentration of the abrasive grits.

According to another preferred aspect of the invention, the material removal rate can be used in an aforementioned algorithm that optimizes finishing process, e.g., lapping, parameters to achieve the desired bore geometry within the specified bore size limits. The optimization algorithm may employ a variety of predictive factors. The values of some of these predictive factors may be application dependent. The algorithm may include analysis of data collected from previous iterations or during the process to adaptively correct the predictive factors that are to be used for optimization of the process. In this manner the control system "learns" how best to finish or lap a bore with minimal human intervention. These predictive factors can be stored in the memory of the control system or on some media to be recalled when the same application is to be lapped at another time.

DETAILED DESCRIPTION OF THE INVENTION

Figure 1:
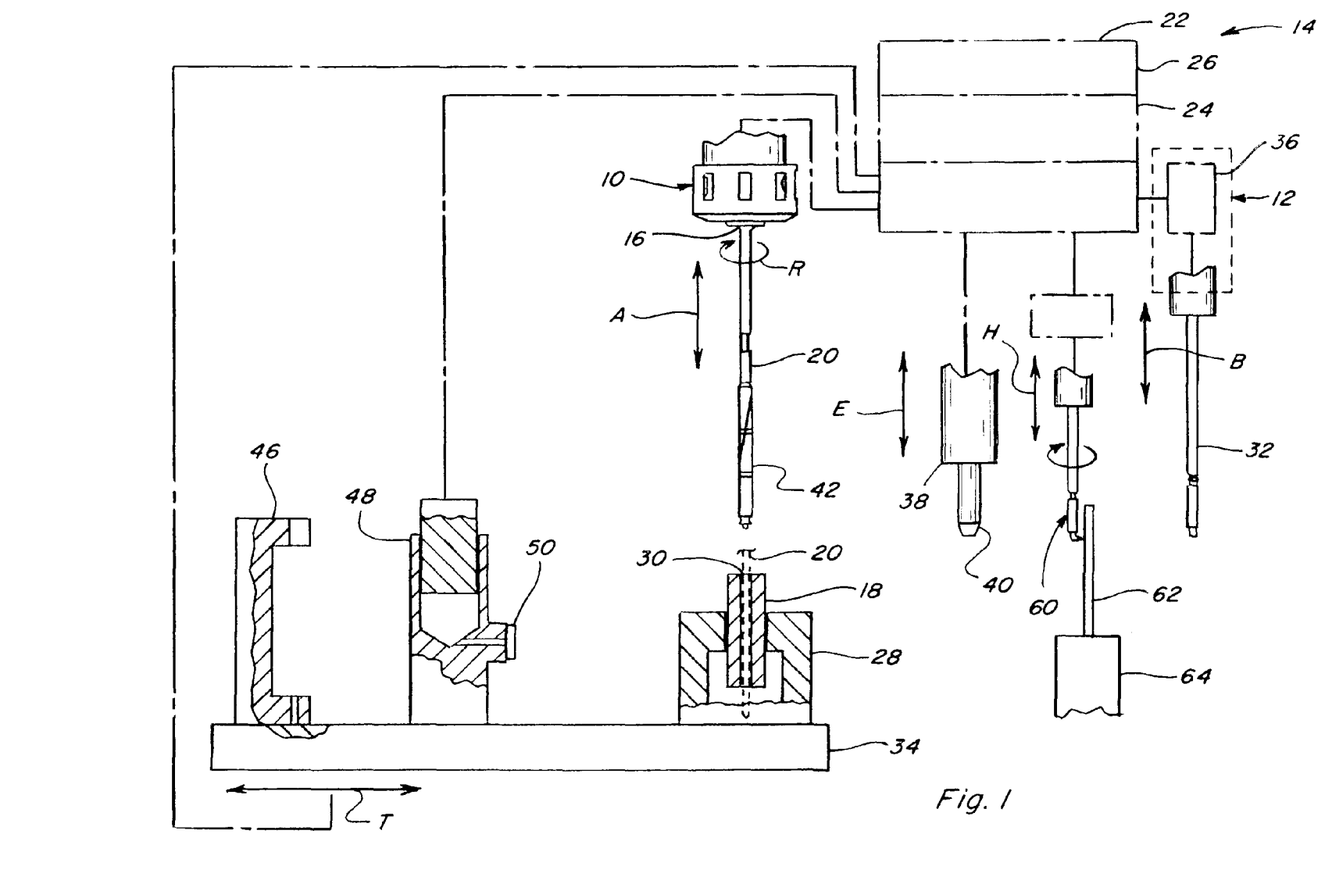
FIG. 1 shows aspects of an automated lapping and gaging system of the present invention.
Figure 2:
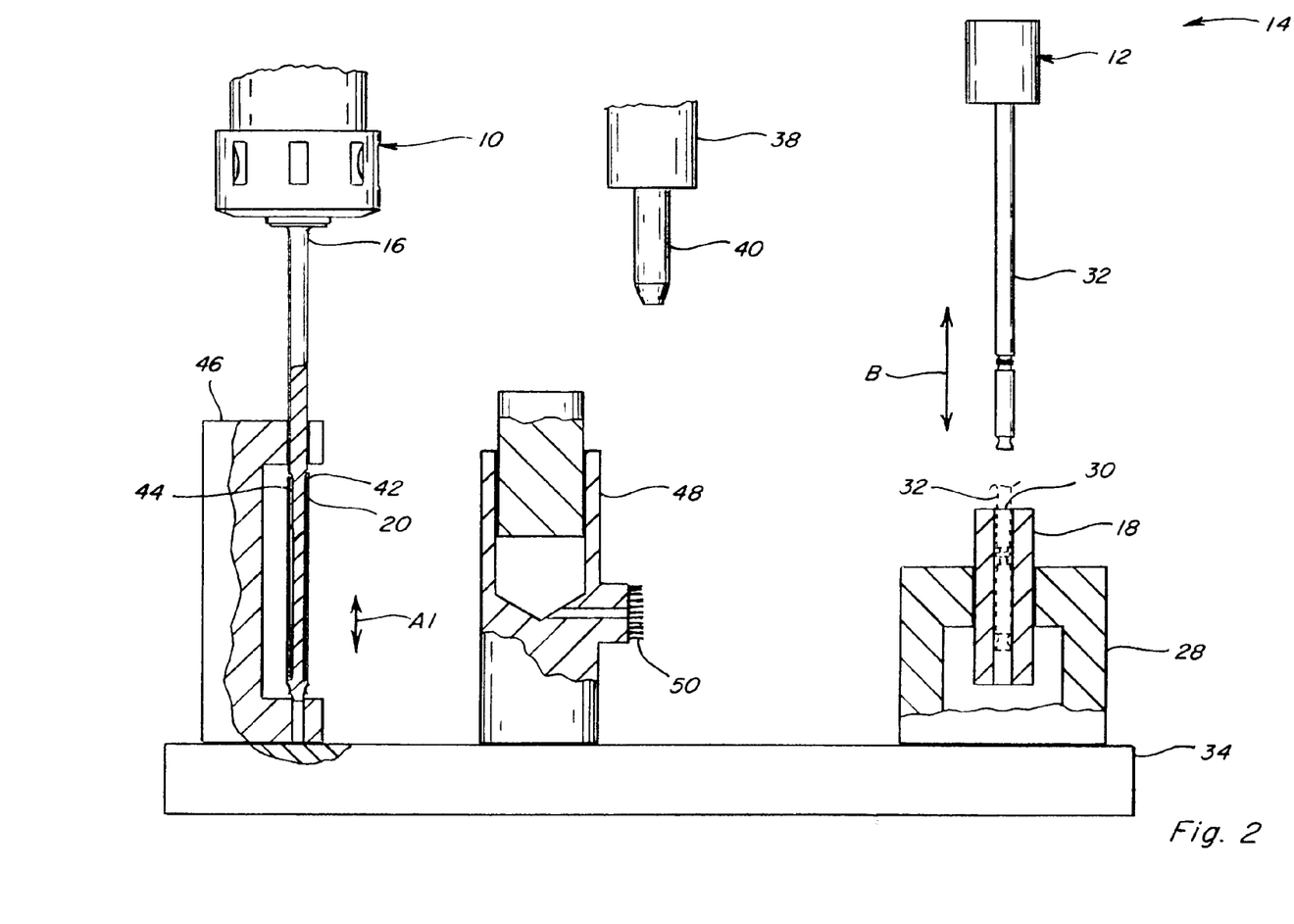
FIG. 2 shows some of the aspects of the system of FIG. 1, in use according to steps of a process of the invention.
Figure 3:
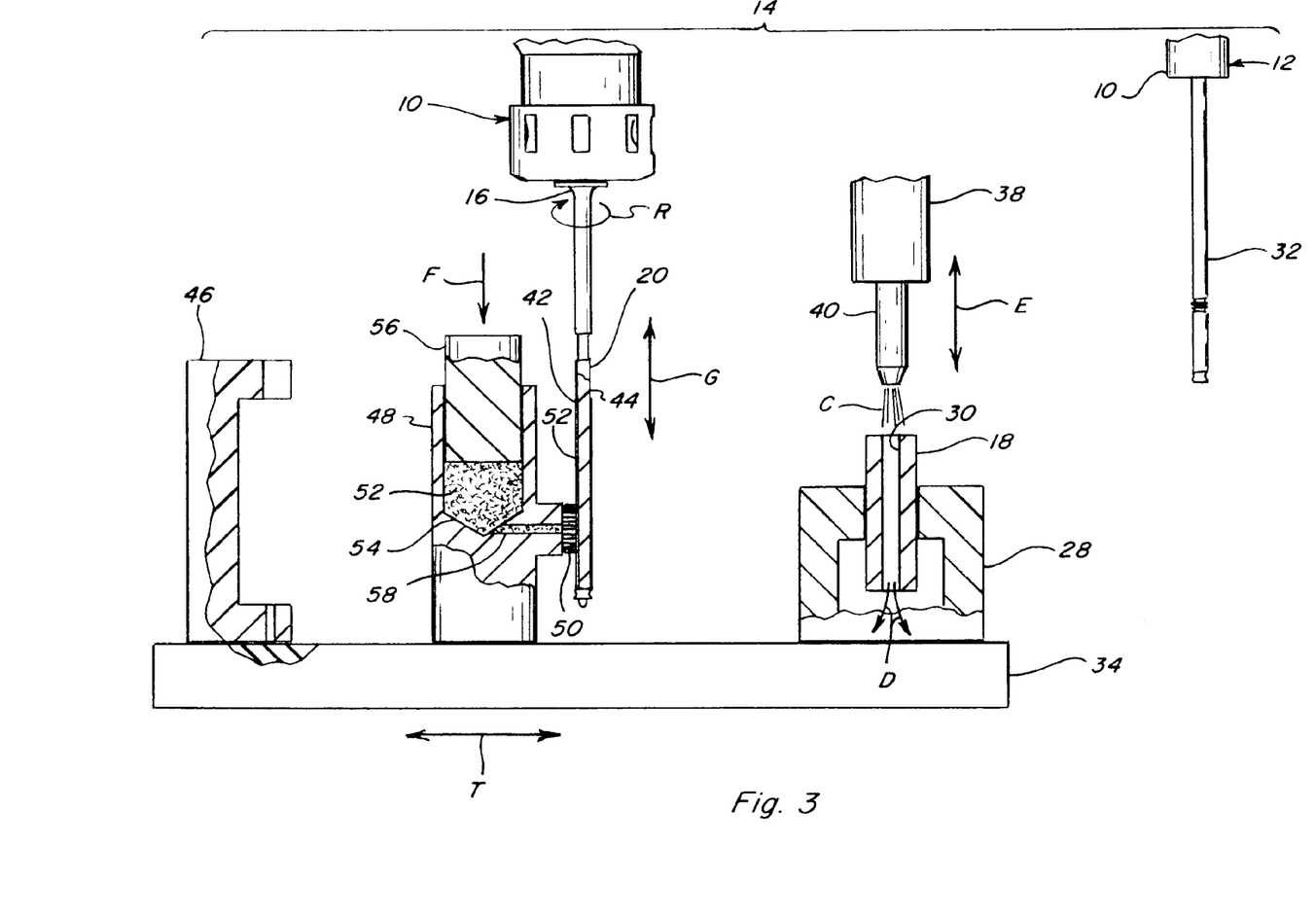
FIG. 3 shows aspects of the system of the invention in use according to steps of the invention.

Referring now to FIGS. 1, 2 and 3, the present invention utilizes an automated bore finishing machine 10 and an automated gaging machine 12, integrated into a bore finishing and gaging system 14 for performing steps of an automated bore finishing process according to the invention. Bore finishing machine 10 here is configured as a lapping machine, includes apparatus operable for rotating either a spindle 16 or a workpiece 18, here as denoted by arrow R, about a central rotational axis therethrough, while moving either the spindle 16 and a bore finishing tool 20 supported thereby, which here is a lapping tool, or the workpiece 18, in a reciprocating manner axially, as denoted by arrow A, to achieve a relative rotating and stroking motion between the two, in the well known manner. FIG. 1 shows one possible embodiment of this integrated automated finishing and gaging system 14, configured for lapping. System 14 includes a processor operated machine control system 22 connected to (or includes) a data entry or input device 24, e.g., a keyboard, touch screen, etc., and a display device 26, which can incorporate device 24. With these an operator can receive pertinent process information and input, store and recall setup data specific to the workpiece to be lapped such as, but not limited to, the final diameter, bore length, and initial axial position of the tool relative to the bore. The control system 22 governs the rotating and stroking motions of spindle 16 which holds the tool 20.

The workpiece 18 is held in some type of fixture 28 that is sufficiently aligned to the spindle 16 to allow automated insertion of tool 20 into a bore 30 of the workpiece 18, and it holds the workpiece 18 in a manner such that it will resist the torque and axial stroking force while allowing the bore 30 to align itself with the lapping tool 20. Any number of typical honing fixtures of well known construction and operation would be suitable for this purpose. The system 14 includes a transfer means to present the workpiece bore 30 to a bore measuring spindle 32 of gaging machine 12, and also other positions, as generally denoted by arrow T. FIGS. 1, 2 and 3 show a linear transfer table 34 of conventional construction and operation, but a rotary index table or other transfer device of well known construction and operation could be used instead. Alternately the devices shown on the transfer table 34 could each be mounted on independent actuators. FIG. 2 shows the workpiece bore 30 in position under the measuring spindle 32. Alternately, a means could be provided to insert a measuring spindle into the workpiece bore 30 while the workpiece 18 remains in a fixed location.

The measuring spindle 32 will have the ability to be inserted into and moved along bore 30 and to measure the diameter of the bore 30 in multiple separate axial locations that may be defined and programmed into the machine control system 22. The system 22 will include a means to move the measuring spindle 32 relative to the workpiece bore 30 in an axial direction to accomplish these measurements, as denoted by arrow B. Optionally the measuring spindle 32 could also be made to rotate relative to the workpiece bore 30 so as to obtain diameter measurements at various angular positions about the bore 30 as well.

The positions of all the moveable devices, e.g., spindle 16, table 34, are sensed by means of linear or rotary encoders or similar devices (not shown) in the well known manner. This encoder data is fed back to the control system 22 ensuring that all positions are known with their respective measurements and motions (arrows A, Al, B, D, E, F, G, H, and T) are controlled in the desired manner.

The measuring spindle 32 will include a sensor 36 configured and operable to convert the measurement signal (e.g. a differential pressure in the case of an air gage) to an electrical signal that can be understood by the control system 22, in the well known manner.

To avoid measurement error, it is desirable to clean the workpiece bore 30 by some means, typically (but not limited to) involving a cleaning fluid and/or compressed air, before it goes to the measuring spindle 32. To accomplish this, the device, e.g. table 34, that moves the workpiece 18 from the tool 20 to the measuring spindle 32 (arrow T), also pauses at a washing station 38. FIG. 3 shows the workpiece bore 30 positioned under washing station 38, which is configured to be automatically operable, e.g., under control of control system 22, to direct a spray of fluid/compressed air, denoted by spray C, into the bore 30, to wash or remove loose lapping compound and other material therefrom, as denoted by arrows D. The lapping process typically does not generate much heat, but for close tolerance work, even small temperature rises in a workpiece, such as workpiece 18, can result in a measurement error. Thus, washing station 38 can also serve to bring the workpiece 18 to a reference temperature prior to measuring the bore 30. The fluid can be held to a specific temperature by any typical temperature control means, and the workpiece 18 can be held under the fluid for a period of time determined by the control system 22 and/or specific setup data. It may also be useful to move the fluid nozzle 40 in some manner to facilitate washing. This motion would also be coordinated by the control system 22, and can include, for instance, an axial reciprocating movement, as denoted by arrow E.

The process of the invention can accommodate more than one type of bore finishing tool. Conventional tools 20 for lapping include sleeves 42 that are slit and have a tapered internal surface that mates with a tapered arbor 44 in the well known manner. Expanding the lap diameter is accomplished by moving the lapping sleeve 42 axially up the tapered arbor 44, as denoted by arrow A1. An alternate design of lapping tool (not shown) can be one that has and internal wedge that is moved axially by means of a feed system within the spindle of the machine that holds the lapping tool. This axial motion of the wedge relative to the external portion of the lapping tool will cause the lapping tool to expand radially. There are many well known commercially available tools that are constructed and operate in this manner.

If the latter type of lapping tool is used, then lap expansion is easily automated by control of the feed system within the spindle of the machine. This could be either periodic or continuous expansion of the lapping tool during the process.

Expansion or retraction of conventional lapping tools can also be automated by coordination of the motions that are already available. A fixture 46 can be made that will contact/engage one or both ends of the lapping sleeve 42. By a combination of moving the lapping tool spindle 16 (arrow A1) and moving a transfer device that holds this fixture, e.g., table 34 (arrow T), the fixture 46 can be placed in contact (or nearly in contact) with the lapping sleeve 42. FIG. 2 shows the tool 20 positioned within such a fixture 46. In this location a precise axial motion of the lapping spindle 16 relative to this fixture 46 (arrow A1) will cause the lapping sleeve 42 to move up or down relative to the tapered lapping arbor 44 causing the diameter of the lapping sleeve 42 to expand or retract. The axial motion of the lapping spindle is sensed by an encoder that feeds back to the control system 22. By making a controlled positional move, relative to the last known position where the lapping sleeve 42 was engaged by the fixture 46, a controlled amount of diameter expansion or retraction is achieved.

In lapping, the loose abrasive grits are usually dispersed in oil, grease or other fluid or semisolid carrier which is applied to the surface of the tool 20. This mixture is referred to as lapping compound 52. In the automated system 14 shown, an external lapping compound applicator 48 can be moved via coordinated motions of the lapping spindle 16 and transfer table 34 so that the a brush 50 of the applicator 48 will brush or otherwise apply a thin coating of the lapping compound 52 to the surface of the lapping tool. FIG. 3 shows the lapping compound 52 in a reservoir 54. An actuator 56 is urged toward reservoir 54, as denoted by arrow F, to provide pressure or controlled motion to dispense the lapping compound 52 to brush 50 or other such surface applicator via a passage 58 connecting reservoir 54 with the brush. Slow rotation (arrow R) and axial motion (arrow G) of the tool 20 against applicator 48 will impart a thin layer of fresh lapping compound 52 to the surface of the sleeve 42 of the tool 20. These motions are governed by the control system 22. This device may also have a sensor (not shown) for detecting when the reservoir 54 of lapping compound 52 must be replenished so that at that time the control system 22 can display a corresponding message and/or stop the lapping cycle.

Alternately, it is envisioned that lapping tools could be constructed such that they hold an internal reservoir of lapping compound that is dispensed by an axial motion of a piston inside the lapping tool. This axial motion could be accomplished by a system within the spindle, e.g. a honing machine feed system. A third alternate is envisioned where a less viscous fluid carrying the loose abrasive is fed through an axial passage in the lapping tool in the manner of coolant-fed tools that are commonly used in other types of machining operations. It is also envisioned that more than one lapping compound dispenser could be employed in the same process to supply different compounds at different times of the lapping cycle. For example, a more aggressive cutting compound could be employed at the beginning of the lapping cycle, and then a finer compound used for surface finish improvement could be employed toward the end of the cycle. All of these means for keeping the lapping tool supplied with loose abrasive will be controlled by the control system 22.

Also shown in FIG. 1 is an optional measuring device 60 configured and operable to measure the outside diameter of a mating part 62 where functional fits require each bore to be "match lapped" to a mating part which will be cooperatively received in the bore. Device 60 shown is a conventional coordinate measuring machine operable in the well known manner for "probing" the outer surface of a part 62, e.g., by relative rotating (arrow R) and longitudinal (arrow H) movements while a probe of device 60 is in contact with the part, and electronically providing feedback of the outside diameter data to the machine control system 22 so that the target final lapped bore diameter is determined by addition of a specified clearance. Part 62 can be held stationary using any convenient means, such as a holding fixture 64 shown. Alternatively, size and geometric data relating to a mating part such as part 62 shown, could be obtained using a variety of other devices, such as, but not limited to, a female air probe which would be placed around the part or into which part 62 would be inserted, and measured.

There are two critical elements of controlling a bore lapping process. The first is to keep the bore progressing toward or maintaining the required level of cylindricity. The second is to keep the material removal rate at a sufficient level that minimizes the cycle time while still maintaining the required bore geometry. There can often be a trade off between cylindricity and material removal rate as follows: Faster material removal rates can be accomplished by techniques that will usually increase the pressure of the lapping tool against the bore. Many workpieces that are lapped have thin walls or other features that could cause distortion when greater pressure is applied to the bore wall. Also the surface finish of the bore may be rougher when faster material removal rates are attempted. A fine surface finish is usually a required specification for lapped bores.

In hand lapping these two critical elements are controlled by the individual skill and judgment of the lapping operator. In the present invention these elements are controlled by algorithms that process feedback from the measurement process in addition to specific mechanism design features.

With either manual lapping or the proposed automated lapping process of the invention, the process is iterative in that the lapping itself must be stopped periodically for the bore to be gaged in a number of locations. In the automated process of the invention described herein, these bore measurements, taken at known axial locations (by an encoder located on the gage positioning device), are treated mathematically to determine an optimum set of values for the lapping control parameters, such as stroke position, stroke length and duration of the next lapping iteration. This optimization is targeted to achieve the desired bore geometry (usually straightness) within the specified bore size limits. Additionally the data may be used to alter the stroke profile either for the entire next iteration or in some continuously changing fashion. In this manner bore defects are minimized or eliminated over successive iterations.

Also since some localized bore defects can be difficult to remove by lapping due to other features on the workpiece, the machine control program may provide an option for an operator to enter the bore size profile dimensions of a known "good" workpiece so that the program can target that known "good" bore profile. This can be used not only to allow for some level of defect in certain location, but to create a deliberate non-cylindrical profile, e.g. a specified amount of taper in a specified direction.

According to the invention, the bore measurements taken at the end of each iteration are compared to those from the last iteration. With that data and the known lapping time of the last iteration, a rate of material removal is calculated. This statistic is used in several ways. First it is compared to some minimum acceptable rate that is entered by an operator or recalled from previously stored setup data. When the lapping rate for one iteration has fallen below the minimum acceptable rate some corrective action must be taken. This will either take the form of applying more lapping compound to the surface of the lap, or expanding the lap by an amount that is determined by setup data or by the control program.

This current rate of material removal is also used in the aforementioned algorithm that optimizes lapping parameters to achieve the desired bore parameter, e.g., geometry within the specified bore size limits. The optimization algorithm may employ a variety of predictive factors. The values of some of these predictive factors may be application dependent. The algorithm may include analysis of data collected from previous iterations or during the process to adaptively correct the predictive factors that are to be used for optimization of the process. In this manner the control system "learns" how best to lap a bore with minimal human intervention. These predictive factors can be stored in the memory of the control system or on some media to be recalled when the same application is to be lapped at another time.

At the beginning of any new application, the control software will query the operator to input data specific to the new application. The software also instructs and aids the operator in setting initial machine and device positions that will allow for automated lapping of the first workpiece. All inputted data can be stored and then recalled at a later time for quick and easy setup.

Also some applications require bores to be lapped to match the measured diameters of a mating part. This can be accomplished simply by an operator entering each target diameter at the beginning of the lapping cycle or a system of measuring the mating part, e.g., using device 60, and sending that information to the control system could be integrated into the automated lapping system.

In one embodiment, steps of the automated bore lapping process of the invention can be summarized as follows:
1. The workpiece is loaded into a fixture, by a manual and/or an automatic system, such as, but not limited to, a pick and place system.
2. The lapping machine is given a signal to start the automated lapping cycle again either by operator action or by communication with a workpiece loading system.
3. The fixture and workpiece are moved to present the bore to a bore gaging device.
4. The bore gaging device moves to enter the bore and measure its diameter at precise locations that have been entered by an operator or recalled from stored setup data. If a measurement is determined to be beyond a limit therefor, is already too large, and/or a geometric defect cannot be corrected by the process, the process can be automatically halted and the operator notified, and/or the workpiece rejected.
5. The bore measurement data is compared to the current diameter of the lapping tool. (The current diameter of the lapping tool will be stored in memory unless a new tool has just been installed in which case an operator will need to enter data or otherwise initialize this position.)
6. The lapping tool will be retracted to a defined diameter that will just clear the minimum diameter that was found in the bore. This retraction is accomplished by the coordinated movement of the lapping spindle and a mechanism holding a device made for this purpose or by a machine feed system movement in the case of a lapping tool of suitable design.
7. Coordinated motion of the lapping spindle and lapping compound applicator will apply a layer of lapping compound to the surface of the lapping tool or deliver it into the bore via internal porting in the tool system.
8. The workpiece and fixture will be moved in relation to the lapping spindle and the lapping tool will enter the bore and begin the lapping iteration, i.e. spindle turning and stroking the tool within the bore for an amount of time determined by the control program.
9. The lapping tool will be moved out of the bore and the workpiece and fixture will move to present the bore to a cleaning/cooling station. This may include some nozzle that enters the bore by controlled motion.
10. The fixture and workpiece are moved to present the bore to the gaging device and the bore is again measured in multiple locations.
11. The in-process bore measurement data are analyzed and compared to previous bore measurement data to make automated decisions regarding adjusting one or more process parameters, e.g., the stroke reciprocation limits, stroke profile, stroke speed and spindle speed for the next iteration. Automated decisions are also made with regard to the rate of material removal and if needed whether to increase it by means of applying more lapping compound or by expanding the lap. Other data analysis is done to communicate via a display the status of the lapping process and/or warnings that could merit operator attention, such as if a bore parameter is already beyond a final value therefor or a defect is determined that cannot be corrected using the tool and/or process. (In some cases the warning could be serious enough to warrant a stoppage of the cycle until the operator has signaled that corrective action has been taken.)

12. The bore measurement data are analyzed to assess the accuracy of any predictive factors used in the control algorithm. Corrections to these factors are made where indicated and the updated factors are stored for future calculations.
13. If the program determines that an expansion of the lapping tool is needed, then that step is taken. This expansion is accomplished by the coordinated movement of the lapping spindle and a mechanism holding a device made for this purpose or by a machine feed system movement in the case of a lapping tool with suitable design features to for engagement with the machine feed system.
14. If the program determines that lapping compound is needed then it is applied as described in step 7 above.
15. Steps 8 through 14 above are repeated until the final bore parameter or parameters, e.g., size and geometry reaches the tolerance that has been set for the given workpiece. The fixture and workpiece are then presented to an unloading station and the machine signals that the lapping cycle is complete.

The system described above can have many variations and optional features. It is envisioned that other embodiments could include one or more of the following:

A torque sensing or load determining device mounted in either the workpiece fixture or the spindle that accurately measures the lapping torque or loads generated by the lapping operation and feeds that data back to the control system in real time so that the control system can sense where the bore is tighter or looser so that it can take corrective actions (e.g. altering the stroke) based on that and other data. This step requires that the torque data be coordinated with the axial tool position data from the encoder reading the linear motion of the spindle.

The workpiece is flooded with or immersed in an abrasive-containing media, or the abrasive is otherwise re-supplied to the tools surface without waiting for measurement data to indicate a depletion of working abrasive.

This process is described above using the loose abrasive in what is commonly know as lapping. However it is envisioned that virtually the same iterative process could be applicable to a fixed abrasive process, e.g., honing, or other process such as superfinishing, reaming, etc., and therefore, in the FIGS. the item identified by the numeral 20 is to be construed as representing a honing tool, superfinishing tool, reamer, or the like, with equal utility. In such a process with fixed abrasive there would be no need to determine when to apply more of an abrasive compound, but the use of bore measurement data and adaptive predictive factors in an algorithm could be used to correct the stroke length and stroke position, alter the stroke profile, and/or determine a duration for the next iteration before re-measuring the bore. It is also envisioned that a tool containing an integrated bore measuring means (e.g. an air gage) could make these compensations in real time without need to pause the material removal process. Still further, it is contemplated that the invention has utility for processes not involving multiple strokes, such as, but not limited to, single pass honing, single pass reaming, and boring.

In light of all the foregoing, it should thus be apparent to those skilled in the art that there has been shown and described a novel bore finishing process according to the invention. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A bore finishing process, comprising steps of:
    determining initial values for a diameter of a bore to be finished at known axial locations therealong, including an initial value for a minimum diameter of the bore to be finished, and a final value for at least one parameter of the bore selected from a group of geometric parameters comprising a diameter, a roundness, a straightness, and a cylindricity of the bore; then automatically
    determining a set of process parameters for controlling at least one bore finishing iteration wherein a lapping tool set to a fixed diameter to just clear the minimum diameter of the bore and coated with a lapping compound will be rotated and reciprocated within the bore for removing material from the surface defining the bore to change the at least one parameter of the bore so as to have an in-process value equal to the final value or that has progressed toward the final value, the set of process parameters comprising at least stroke reciprocation limits, a stroke profile, a stroke speed, and a spindle speed for the lapping tool within the bore and a duration of the iteration;
    performing the bore finishing iteration under control of the process parameters and at the set fixed diameter and then removing the tool from the bore, cleaning the lapping compound therefrom, measuring in-process values for the diameter of the bore at the known axial locations, and comparing the in-process values to the initial values for the diameter of the bore to determine whether to adjust one or more of the stroke reciprocation limits, the stroke profile, the stroke speed, and the spindle speed for a next bore finishing iteration; and
    determining a rate of material removal as a function of at least the determined in-process values and the duration of the iteration, and determining whether to apply new abrasives to the tool or to expand the tool, as a function of the rate of material removal, for the next bore finishing iteration.

2. The process of claim 1, comprising a step of automatically ceasing the bore finishing iterations when the at least one parameter of the bore reaches the final value.

3. The process of claim 1, wherein the at least one parameter of the bore comprises a non-cylindrical profile.

4. The process of claim 3, wherein the non-cylindrical profile comprises a specified amount of taper in a specified direction.

5. The process of claim 3, wherein the non-cylindrical profile is created from operator entered bore size profile dimensions.

6. The process of claim 1, comprising a step after the steps of performing the bore finishing iteration under control of the process parameters and measuring the in-process values; of
automatically analyzing the measured in-process values to assess accuracy of the at least one predictive factor, and if accurate, then continuing to use the at least one predictive factor in the next bore finishing iteration, and if inaccurate, correcting the at least one predictive factor and using the corrected predictive factor in the next bore finishing iteration.

7. The process of claim 1, wherein the step of determining the initial value for the minimum diameter of the bore comprises determining a location of the minimum diameter within the bore.

8. The process of claim 1, wherein during the bore finishing process a load condition exerted on the tool will be monitored, and at least one of the process parameters other than the diameter of the tool will be adjusted in-process as a function of the monitored load condition.

9. The process of claim 8, wherein the process parameter adjusted in-process as a function of the monitored load condition comprises the duration of the iteration.

10. The process of claim 8, wherein the process parameter adjusted in-process as a function of the monitored load condition comprises a length of the stroke.

11. The process of claim 1, wherein the at least one parameter of the bore is a function of a parameter of a part to be matingly received in the bore.

12. The process of claim 11, wherein the parameter of the part comprises an outer diameter of the part.

13. The process of claim 1, wherein the step of determining whether to apply new abrasives to the tool comprises automatically determining whether to apply an abrasive lapping compound having at least one characteristic that differs from a characteristic of an existing lapping compound on the tool.

14. The process of claim 1, comprising an additional step of automatically comparing the determined initial values for the diameter of the bore to a predetermined limit for the diameter, and if the values for the diameter of the bore exceed the limit, then ceasing the process.

15. A bore finishing process, comprising steps of:
initially determining at least one parameter of a bore of a workpiece selected from a group of parameters comprising a diameter, a roundness, a straightness, and a cylindricity of the bore, and a final value for the at least one parameter of the bore, then automatically:
determining a set of process parameters for controlling at least one bore finishing iteration wherein a finishing tool will be rotated and reciprocated within the bore for removing material from the surface defining the bore to change the at least one parameter of the bore so as to have an in-process value equal to the final value or that has progressed from the initial value toward the final value, the set of process parameters comprising at least a stroke length and a stroke position of the tool within the bore and a duration of the iteration, and at least one parameter of the finishing tool configured as a function of at least one predictive factor for changing the at least one parameter of the bore by a predetermined amount;
performing the bore finishing iteration under control of the process parameters and then measuring the in-process value at known axial locations in the bore; then mathematically treating the measured in-process values to determine an optimized set of values for the process parameters for a next bore finishing iteration, including at least a stroke length and a stroke position of the reciprocation and the duration of the next iteration, for achieving a target value for the at least one parameter of the bore of the next iteration within specific limits, including determining whether the at least one parameter changed by at least the predetermined amount; and
  i. if yes, then continuing to use the at least one predictive factor in a next bore finishing iteration; and
  ii. if no, then changing at least one of the at least one parameter of the tool and the at least one predictive factor in a manner for changing the at least one parameter of the bore by the predetermined amount during the next bore finishing iteration of the bore finishing process.

16. The bore finishing process of claim 15, wherein the tool is a lapping tool and the in-process value comprises a diameter of the bore, and comprising a step after measuring the in-process value at known axial locations in the bore; of automatically determining a rate of material removal as a function of at least the measured in-process values and the duration of the iteration, and automatically determining whether to apply new abrasives to the tool or to expand the tool as a function of the rate of material removal.

17. A bore finishing process, comprising steps of:
determining an initial value for at least a minimum diameter of a bore to be finished, and a final value for at least one parameter of the bore selected from a group of geometric parameters comprising a diameter, a roundness, a straightness, and a cylindricity of the bore; then automatically
determining a set of process parameters for controlling at least one bore finishing iteration wherein a lapping tool set to a fixed diameter to just clear the minimum diameter of the bore and coated with a lapping compound will be rotated and reciprocated within the bore for removing material from the surface defining the bore to change the at least one parameter of the bore so as to have an in-process value equal to the final value or that has progressed toward the final value, the set of process parameters comprising at least a stroke length and a stroke position of the lapping tool within the bore and a duration of the iteration, and being determined at least in part as a function of at least one predictive factor determined from at least one previous bore finishing iteration;
performing the bore finishing iteration under control of the process parameters, and then removing the tool from the bore, cleaning the lapping compound therefrom, and measuring in-process values for the diameter of the bore at known locations in the bore; and
analyzing the in-process values to assess accuracy of the at least one predictive factor, and if accurate, then continuing to use the at least one predictive factor, and if inaccurate, correcting the at least one predictive factor.

18. The process of claim 17, wherein the at least one parameter of the bore comprises a non-cylindrical profile.

19. The process of claim 18, comprising a step of entering dimensions for the non-cylindrical profile.

20. The process of claim 17, wherein the at least one parameter of the bore is a function of a parameter of a part to be matingly received in the bore.

21. The process of claim 20, wherein the parameter of the part comprises an outer diameter of the part.

22. The process of claim 17, wherein during the bore finishing process a load condition exerted on the tool will be automatically monitored, and at least one of the process parameters other than a diameter of the tool will be automatically adjusted in-process as a function of the monitored load condition.

23. The process of claim 17, wherein the step of determining an initial value for at least a minimum diameter of the bore comprises determining a location of the minimum diameter within the bore.

\* \* \* \* \*